United States Patent
Olchovik et al.

(10) Patent No.: US 12,372,826 B2
(45) Date of Patent: Jul. 29, 2025

(54) SINGLE SUBSTRATE POLARIZER AND TOUCH SENSOR FOR DISPLAY SCREENS

(71) Applicant: DELL PRODUCTS L.P., Round Rock, TX (US)

(72) Inventors: Pavel Olchovik, Round Rock, TX (US); Shih-Kai Wang, Taipei (TW); Asim M. Siddiqui, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/965,444

(22) Filed: Oct. 13, 2022

(65) Prior Publication Data

US 2024/0126116 A1  Apr. 18, 2024

(51) Int. Cl.
| | | |
|---|---|---|
| G02F 1/1335 | (2006.01) | |
| G02B 5/30 | (2006.01) | |
| G02F 1/1333 | (2006.01) | |
| G02F 1/13357 | (2006.01) | |
| G06F 3/041 | (2006.01) | |

(52) U.S. Cl.
CPC ....... *G02F 1/133528* (2013.01); *G02B 5/305* (2013.01); *G02F 1/13338* (2013.01); *G02F 1/133603* (2013.01); *G06F 3/0416* (2013.01); *G06F 2203/04103* (2013.01)

(58) Field of Classification Search
CPC .................................................. G02F 1/133528
See application file for complete search history.

(56) References Cited

U.S. PATENT DOCUMENTS

| | | | |
|---|---|---|---|
| 9,372,521 B2 | 6/2016 | Sultenfuss et al. | |
| 9,558,527 B2 | 1/2017 | Sierra et al. | |
| 10,216,304 B2 | 2/2019 | Huang | |
| 10,276,081 B2 | 4/2019 | Ong et al. | |
| 10,656,761 B2 | 5/2020 | Chen et al. | |
| 10,997,687 B1 | 5/2021 | Guerra et al. | |
| 11,307,704 B1 | 4/2022 | Pelissier et al. | |
| 2010/0283943 A1* | 11/2010 | Kimura | G02F 1/133528 156/64 |
| 2012/0319966 A1* | 12/2012 | Reynolds | G06F 3/04164 345/173 |
| 2013/0248228 A1* | 9/2013 | Liu | G06F 3/041 174/254 |
| 2015/0177867 A1* | 6/2015 | Chung | G06F 3/0446 427/79 |
| 2016/0326388 A1* | 11/2016 | Petcavich | C09D 11/101 |
| 2020/0064676 A1* | 2/2020 | Liang | G02F 1/133602 |
| 2021/0109618 A1* | 4/2021 | Huang | G02F 1/1341 |
| 2021/0405404 A1 | 12/2021 | Chang | |
| 2022/0317850 A1* | 10/2022 | Niu | H10K 59/131 |

OTHER PUBLICATIONS

Olchovik, "Systems and Methods for Increasing Backlight Uniformity for Backlit Display Panels", U.S. Appl. No. 17/501,794, filed Oct. 14, 2021, 39 pgs.

\* cited by examiner

*Primary Examiner* — Edmond C Lau
(74) *Attorney, Agent, or Firm* — Egan, Enders & Huston LLP

(57) ABSTRACT

Methods, apparatus and systems are provided for touch screen displays that utilize a polarizer and a touch sensor circuit that are manufactured on a single substrate, and in which the touch sensor circuitry may be directly printed onto a polarizer substrate to provide a combination of a polarizer and a touch sensor on the same single common substrate.

20 Claims, 6 Drawing Sheets

SINGLE SUBSTRATE POLARIZER AND TOUCH SENSOR FOR DISPLAY SCREENS

FIELD OF THE INVENTION

This application relates to information handling systems and, more particularly, to display panels of information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventional touch screen display devices for information handling systems typically employ a liquid crystal display (LCD) panel that is illuminated by a backlight panel area under the LCD panel, such as light emitting diodes (LEDs) and/or cold cathode fluorescent lighting (CCFL). FIG. 1 illustrates a conventional layer stackup 100 for a conventional touch screen display that is illuminated by a backlight panel 130 (LEDs or CCFLs) of a conventional touch screen display device. As shown in FIG. 1, the conventional layer stackup 100 employs an out cell touch sensor design that includes a separate and independent touch sensor module 150 that is adhered between a 9-hardness (9H) protective cover 102 and a separate first (upper) output polarizer substrate 114 of a LCD display panel 160 by optically clear adhesive (OCA) layers 104 and 112. The LCD display panel 160 includes a thin-film-transistor (TFT) layer 116 that is disposed between the first (upper) output polarizer substrate 114 and a second (lower) input polarizer substrate 118 as shown. The conventional touch sensor module 150 itself includes a first film touch sensor layer 106 and a second film touch sensor layer 110 that are adhered together by an OCA layer 108, with a separate flexible printed circuit board (FPC) touch connector layer 120 disposed between the first film touch sensor layer 106 and the second film touch sensor layer 110 as shown. In the conventional configuration, the first (upper) output polarizer substrate 114 of LCD display panel 160 is a separately-formed and independent substrate from touch sensor module 150, and is adhered to the separate touch sensor module 150 by OCA layer 112.

Projected capacitive (PCAP) touch sensors require low resistant traces and follow strict design guidelines. They require a sufficient mechanical buffer zone for acceptable touch performance on the edges. Additional substrates and adhesives attenuate panel luminance. The low resistance trace and design rules of PCAP touch sensors limit the minimum trace widths which also attenuate panel luminance and cause optical artifacts.

Rows and columns of touch sensor circuitry have been printed on the same side of a substrate that is not a polarizer substrate.

SUMMARY OF THE INVENTION

Methods, apparatus and systems are disclosed herein for touch screen displays that utilize a polarizer and touch sensor circuitry that are manufactured on a single substrate, and in which the touch sensor circuit may be directly printed onto the polarizer substrate to provide a combination of a polarizer and a touch sensor on the same single common substrate. This is in contrast to current conventional technology that bonds a separate touch sensor module to a polarizer substrate, and thus always requires the presence of two or more separate substrates. In one embodiment, the touch sensor circuit may be directly printed onto the same configuration of polarizer substrate that is already used for existing conventional touch screen display designs that now employ an independent touch sensor substrate that is separate from (and separately manufactured from) the polarizer substrate, e.g., the touch sensor circuit may be printed directly on the polarizer substrate material as part of the polarizer substrate manufacturing process rather than manufactured as part of an independent substrate for touch sensing. In one embodiment, a touch sensor circuitry pattern may be advantageously added to a polarizer substrate in the polarizer step during manufacture of the polarizer substrate, e.g., using roll to roll printable manufacturing. In one embodiment the disclosed single substrate polarizer and touch sensor may be implemented with any standard display configuration, e.g., with no changes to glass or cell designs.

In embodiments disclosed herein, the disclosed single substrate polarizer and touch sensor provides performance enhancement in touch and front of screen optics with the touch sensor provided in an optimized location. Compared to conventional technology, using the disclosed single substrate for polarizer and touch sensor reduces required materials (including adhesive layer material) and provides reduced cost, reduced weight, superior optical transmission and lower reflection options, and supports thinner higher resistance traces and sustainability goals. Compared to conventional technology, using the disclosed single substrate for polarizer and touch sensor also simplifies design and the production process.

Advantages that may be realized using the disclosed methods, apparatus and systems include touch screen display mechanical designs that are thinner and lighter than conventional touch screen display mechanical designs, touch screen display edge margins that are narrower than edge margins of conventional touch screen display margins, touch screen display edge performance that is improved over conventional touch screen display edge performance, touch screen display stack up transmissivity that is improved or greater than conventional touch screen display stack up transmissivity, improved touch screen display optical properties as compared to conventional touch screen display optical properties, reduced number of substrates and adhesive layers to achieve lower panel luminance attenuation than conventional touch screen display stack ups, lower touch screen display material and manufacturing costs than conventional touch screen display material and manufacturing costs, and more agile production options available as compared to available production options of conventional In-Cell display technology.

In one respect, disclosed herein is a system, including a display panel assembly that includes a display panel. The display panel may include: a first polarizer substrate including polarizer material; printed touch sensor circuitry disposed in direct physical contact with the polarizer material of the first polarizer substrate, and an image layer assembled to the first polarizer substrate.

In another respect, disclosed herein is a method, including printing touch sensor circuitry directly to a bare polarizer material of a first polarizer substrate to form the touch sensor circuitry directly on the polarizer material of the polarizer substrate.

In another respect, disclosed herein is an apparatus, including printed touch sensor circuitry disposed in direct physical contact with a bare polarizer material of a first polarizer substrate.

DESCRIPTION OF ILLUSTRATIVE EMBODIMENTS

Figure 2:
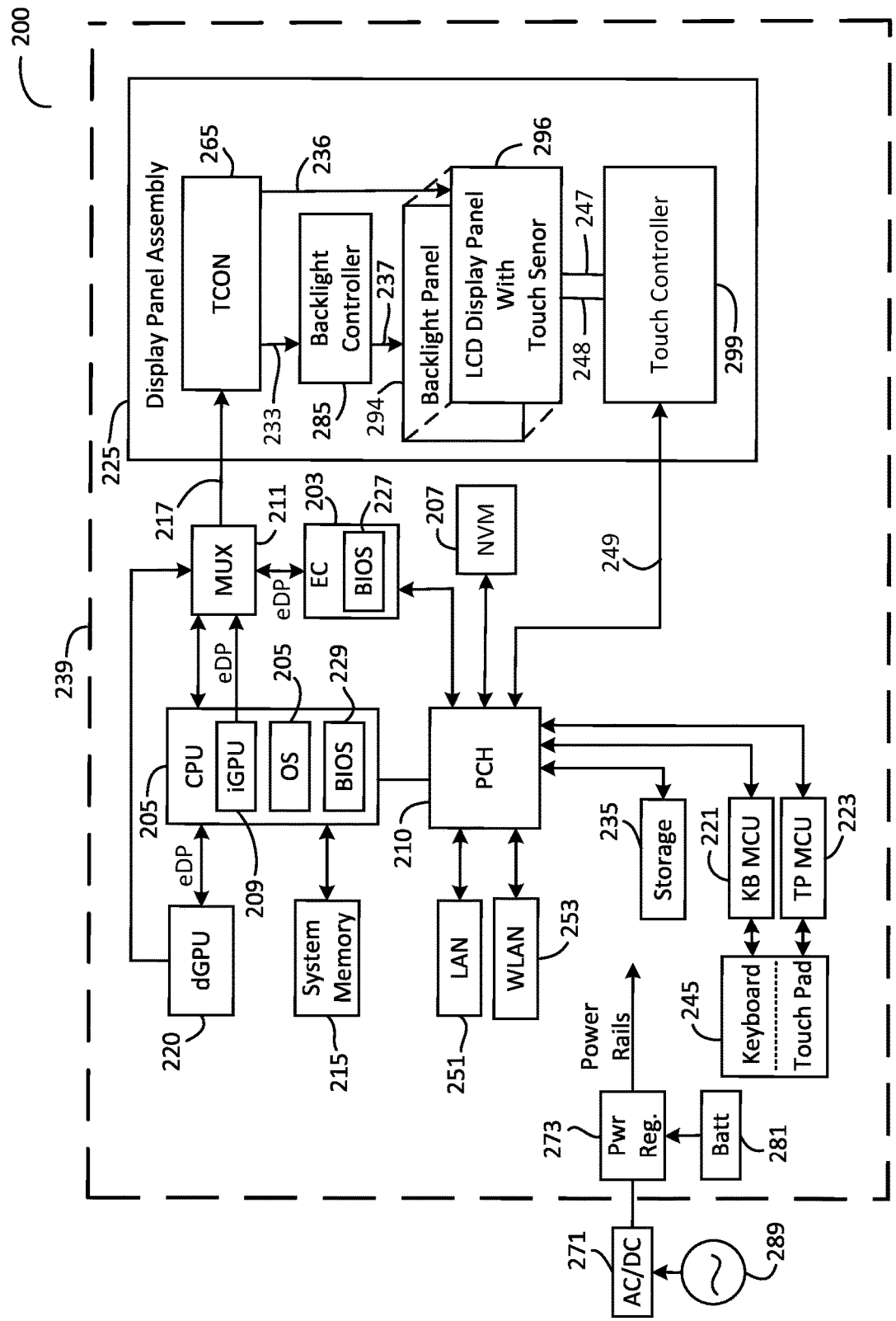
FIG. 2 illustrates a block diagram of an information handling system according to one exemplary embodiment of the disclosed methods, apparatus and systems.

FIG. 2 is a block diagram of an information handling system 200 as it may be configured according to one exemplary embodiment of the disclosed methods, apparatus and systems. Information handling system 200 may be, for example, an all-in-one computer or a mobile or portable information handling system such as a notebook computer, laptop computer, or tablet computer having a chassis enclosure 239 which may be, for example, a plastic and/or metal case (e.g., notebook computer case, tablet computer case, smartphone case, etc.) that encloses and contains the illustrated components of system 200. However, in other embodiments (e.g., such as a desktop or tower computer embodiment), one or more components of information handling system 200 (e.g., such as a display panel assembly described further herein) may be separate components that are positioned external to chassis enclosure 239 and coupled in signal communication with internal components of system 200 (e.g., such as a host programmable integrated circuit 205 described further herein).

Still referring to FIG. 2, information handling system includes host programmable integrated circuit 205 which may be a central processing unit CPU such as an Intel processor, Advanced Micro Devices (AMD) processor, or one of many other suitable programmable integrated circuits currently available. In this embodiment, a host programmable integrated circuit in the form of CPU 205 may execute a host operating system (OS) 205 and system BIOS 229 for system 200. System memory may include main system memory 215 (e.g., volatile random access memory such as DRAM or other suitable form of random access memory) coupled (e.g., via DDR channel) to an integrated memory controller (iMC) of CPU 205 to facilitate memory functions, although it will be understood that a memory controller may be alternatively provided as a separate chip or other circuit in other embodiments.

As further illustrated in FIG. 2, CPU 205 may be coupled to platform controller hub (PCH) 210 (e.g., by direct media interface "DMI") which may be present to facilitate input/output functions for the CPU 205 with various internal components of information handling system 200. Illustrated examples of other such components include system embedded controller (EC) 203 (e.g., coupled to PCH 210 via low pin count "LPC" connection), non-volatile memory (NVM) 207 (e.g., SPI Flash memory device and/or other NVM devices), wireless network controller 253 for wireless local area network (WLAN) or other wireless network communication, integrated network interface card 251 for Ethernet local area network (LAN) or other wired network connection, touchpad microcontroller (MCU) 223, and keyboard microcontroller (MCU) 221.

Also shown coupled to PCH 210 are other components of information handling system 200 which include integrated keyboard and touchpad 245 (which may alternatively be present as separate discrete keyboard and touchpad components), and local system storage 235, e.g., hard drive or other suitable type of permanent storage media such as solid state drive (SSD), optical drives, NVRAM, Flash or any other suitable form of internal storage. Persistent storage (e.g., non-volatile memory 207) may be accessed as needed by EC 203 and/or CPU 205. Such persistent storage 207 may store or contain firmware or other programming (e.g., such as BIOS code and BIOS settings) that may be used by host programmable integrated circuit 205 and/or EC 203 (e.g., shown in FIG. 2 executing EC BIOS code 227).

In one embodiment, information handling system 200 may be a mobile battery-powered information handling system having power supply circuitry and/or internal voltage regulation circuitry 273 that provides power to power-consuming components of system 200 via power rails, and that may be selectively coupled to an external source of system (DC) power, for example AC mains 289 and an AC adapter 271. Information handling system may also include an internal DC power source (e.g., smart battery pack) 281 that is configured to provide system power source for the system load of information handling system, e.g., when an external source of system power is not available or not desirable. Further information on battery-powered information handling system architecture and components may be found in U.S. Pat. No. 9,372,521, which is incorporated herein by reference in its entirety for all purposes. It will also be understood that the particular configuration of FIG. 2 is exemplary only, and that an information handling system may be configured with fewer, additional or alternative components than those illustrated in FIG. 2.

As shown in FIG. 2, CPU 205 itself includes an integrated graphics processing unit (iGPU) 209 and information handling system 200 may also include an optional separate internal discrete graphics processing unit (dGPU) 220 such as a graphics card that is powered by a power source of information handling system (e.g., such as AC adapter 271 and/or internal smart battery pack 281) using internal integrated power supply circuitry and/or internal voltage regulation circuitry 273 of information handling system 200. Examples of different dGPU manufactures and suppliers include, but are not limited to, Nvidia, AMD, etc. Examples of different types of dGPUs include, but are not limited to, Nvidia Quadro, Nvidia Geforce, AMD Radeon, AMD RX, etc.

As further shown in FIG. 2, iGPU 209 of CPU 205 and dGPU 220 may each be coupled to provide data that contains frames of image content (e.g., video image content) via an audio/visual interface (e.g., such as a multi-channel Embedded DisplayPort "eDP" bus) to a multiplexer (MUX) 211. The image content may be, for example, standard definition resolution (SDR) image content, high definition resolution (HDR) image content, etc. Multiplexer 211 may in turn be coupled to selectively provide frames of image content data 217 (e.g., via an eDP bus) from either iGPU 209 or dGPU 205 to a timing controller (Tcon) 265 of liquid crystal display (LCD) display touch panel assembly 225 (e.g., which may be an integrated display assembly in embodiments where information handling system 200 is a notebook computer or other mobile or portable information handling system). In a further embodiment, a system embedded controller (EC) 203 may additionally or alternatively provide data that contains frames of image content (e.g., via MUX 211). Although an LCD display assembly is illustrated in this embodiment, it will be understood that the disclosed methods, apparatus and systems may be implemented with display assemblies that employ organic light emitting diode (OLED) display technology as well.

Tcon 265 may be a programmable integrated circuit (e.g., such as microcontroller) that executes to convert the received image content data format to backlight modulation signals 233 that are provided to a backlight controller 285 (e.g., which may include a programmable integrated circuit such as a microcontroller) which responds by generating corresponding backlight driver signals 237 for controlling luminance (or brightness) levels of backlight panel 294 (e.g., LED and/or CCFL backlight panel) to illuminate LCD display panel with touch sensor 296, e.g., which may have a resolution of 2920 pixels×2080 pixels, 3840 pixels×2160 pixels or other greater or lesser resolution. In one embodiment, backlight panel 294 may be positioned under LCD display panel with touch sensor 296 as shown in FIG. 2, and may include multiple backlight elements such as light emitting diodes (LEDs) and/or cold cathode fluorescent lighting (CCFL) elements. In one embodiment, side-emitting lighting elements (e.g., LED and/or CCFL lighting elements) may also be optionally present (e.g., positioned around the periphery of LCD display panel with touch sensor 296) to illuminate the LCD display panel with touch sensor 296 from the side.

In the embodiment of FIG. 2, Tcon 265 also converts the received image content data to an image output signals in the form of image modulation data stream signals 236 that are provided directly to display components of LCD display panel with touch sensor 296 for controlling generation of images for display by display components of LCD display panel with touch sensor 296. Further information of possible display component configurations and system architectures for LCD display panels may be found described and illustrated in U.S. patent application Ser. No. 17/501,794 filed on Oct. 14, 2021, which is incorporated herein by reference in its entirety for all purposes. Although an LCD display assembly is illustrated in this embodiment, it will be understood that the disclosed methods, apparatus and systems may be implemented in a similar manner to provide and use an OLED display panel with touch sensor 296.

It will be understood that eDP is just one example of a suitable type of data bus interface that may be employed to route graphics data between internal components of information handling system 200, and that any other suitable type of data bus/es may be employed. Other examples of possible dGPU and/or iGPU configurations and system architectures may be found described and illustrated in United States Patent Application Publication Number 2021/0405404, in U.S. Pat. No. 9,558,527, and in U.S. Pat. No. 10,997,687, each of which is incorporated herein by reference in its entirety for all purposes.

In one optional embodiment, image content from CPU 205 may be sourced at any given time either by iGPU 209 or dGPU 220, and may be switchable "on the fly" by multiplexer (MUX) 211 from one to the other, e.g., using drivers of a switchable graphics software utility (e.g., NVidia Optimus available from NVidia of Santa Clara, California; AMD Power Express available from Advanced Micro Devices Inc. of Sunnyvale, California) that may be executing on CPU 205 and that is typically provided by a supplier of the given dGPU 220 that is presently installed in information handling system 200.

Figure 3:
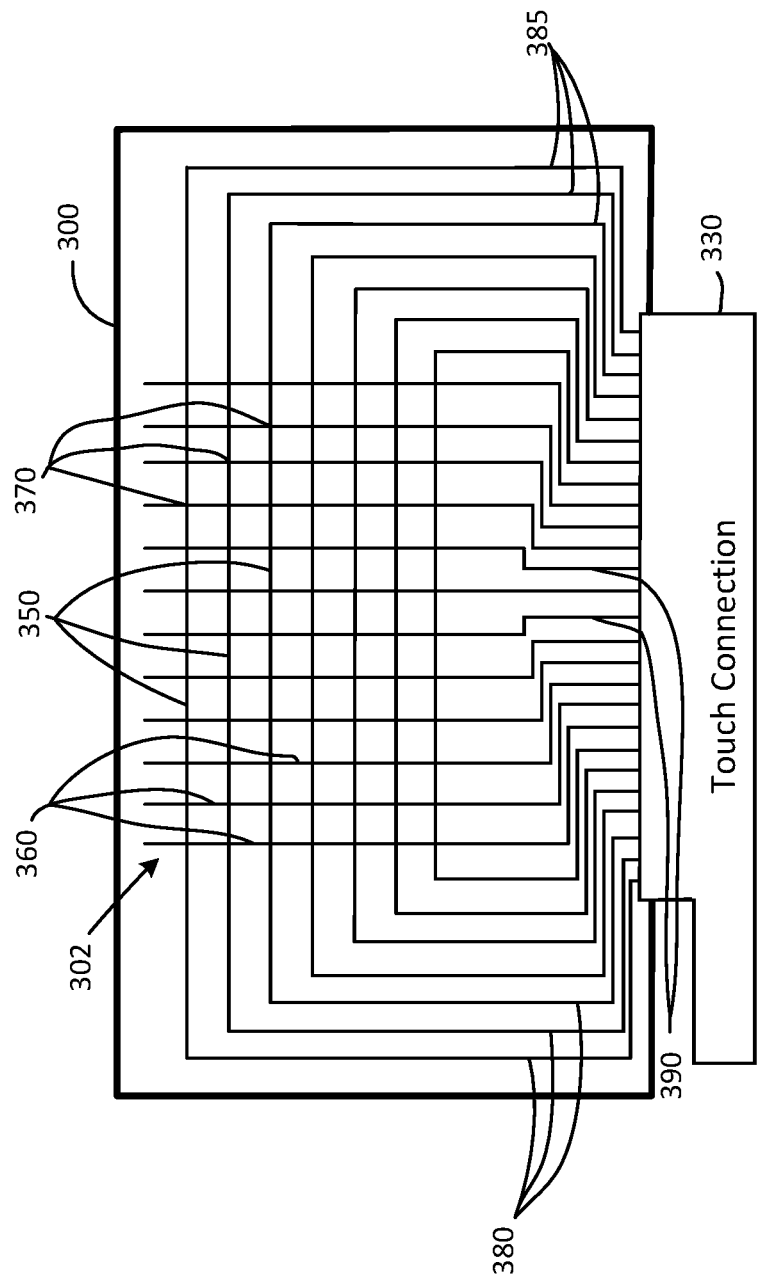
FIG. 3 illustrates an overhead (top) view of a single upper (output) polarizer substrate of a LCD display panel with touch sensor circuitry according to one exemplary embodiment of the disclosed methods, apparatus and systems.
Figure 4A:
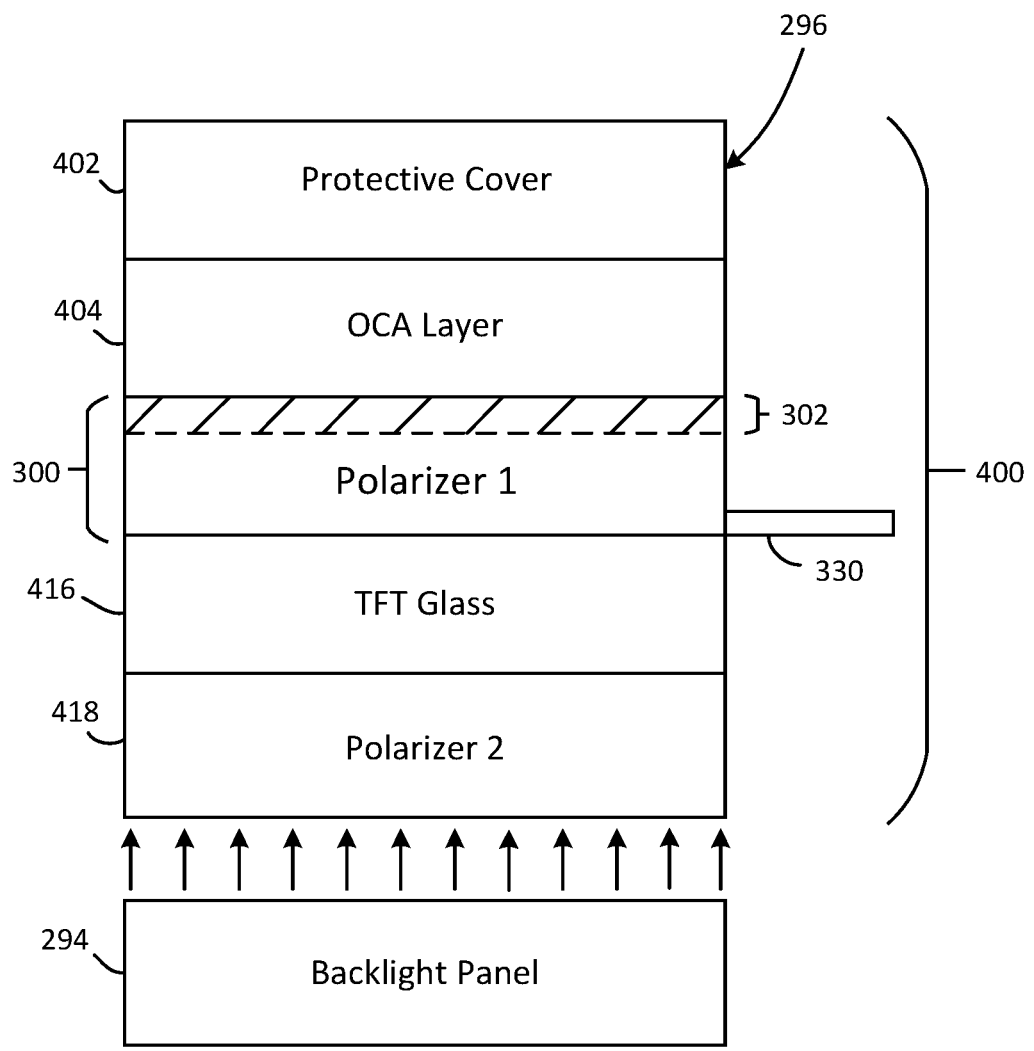
FIG. 4A illustrates a layer stackup for a LCD display panel with touch sensor according to one exemplary embodiment of the disclosed methods, apparatus and systems.
Figure 4B:
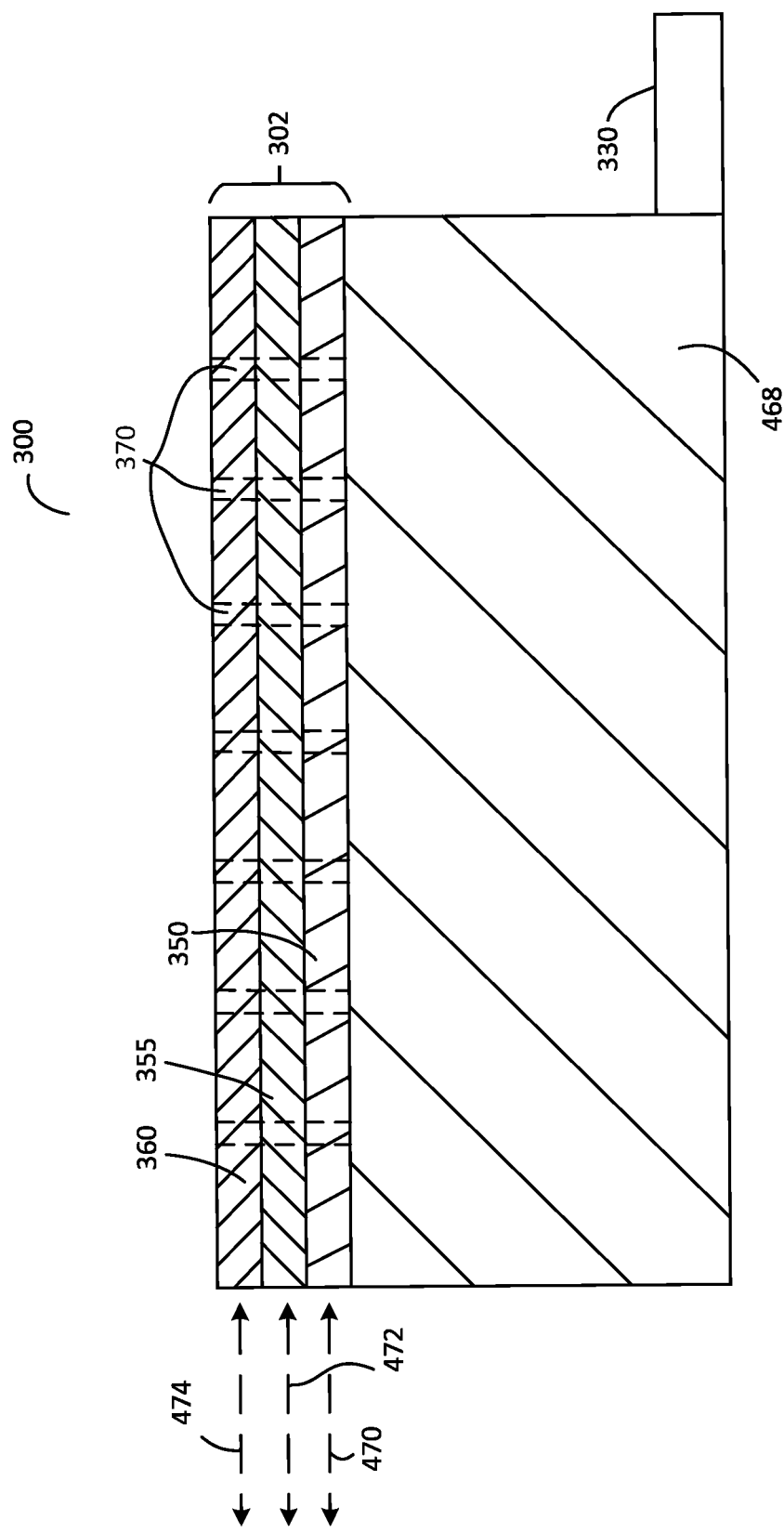
FIG. 4B illustrates a single substrate polarizer with touch sensor according to one exemplary embodiment of the disclosed methods, apparatus and systems.
Figure 5:
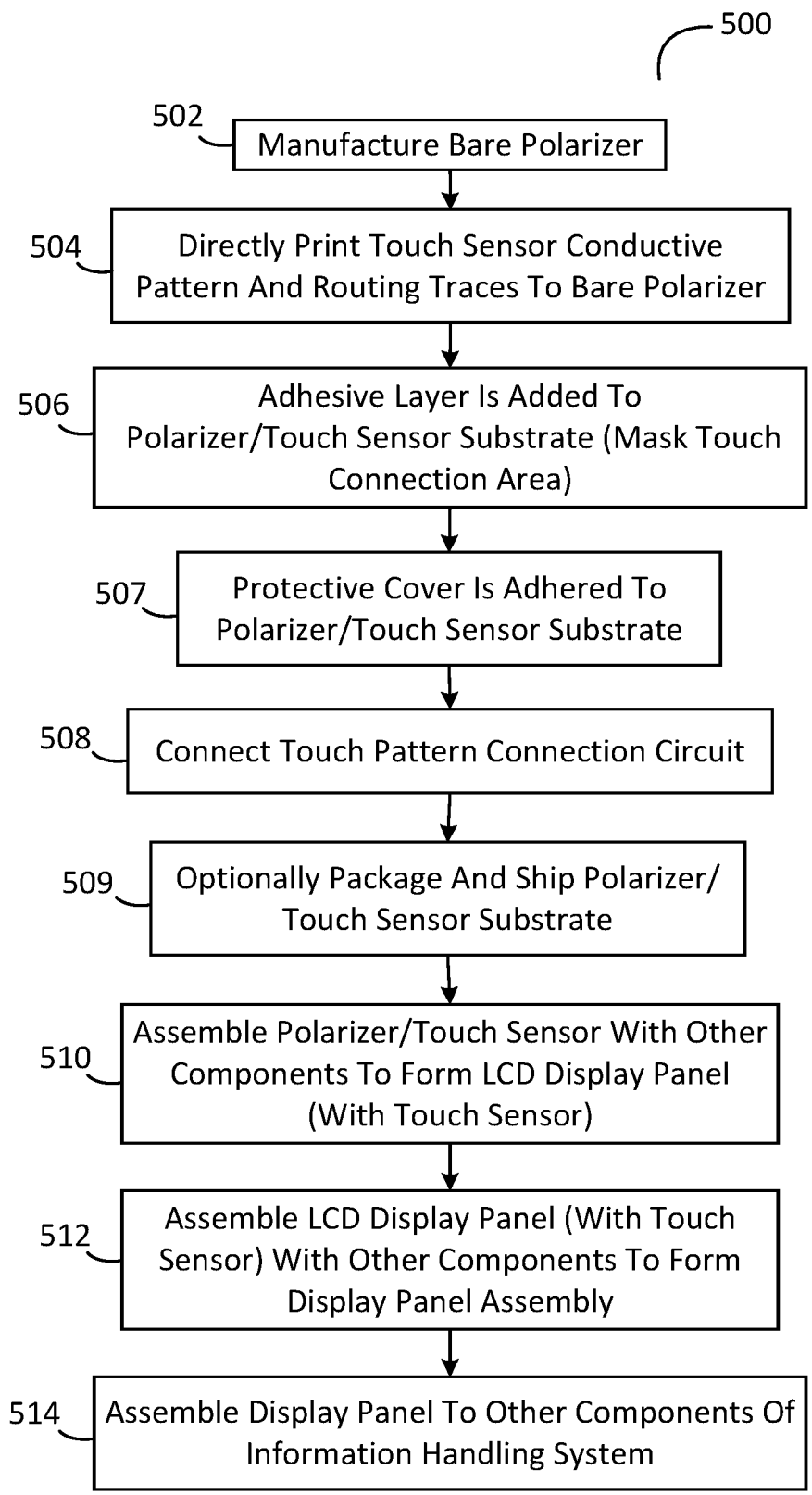
FIG. 5 illustrates methodology according to one exemplary embodiment of the disclosed methods, apparatus and systems.

In the embodiment of FIG. 2, touch sensor circuitry (e.g., including a plurality of X-axis transmit lines and a plurality of Y-axis receive lines) may be printed on the upper or top output polarizer substrate of LCD display panel 296 to form a single-substrate combination of polarizer and touch sensor that is part of LCD display panel 296, as further described and illustrated in FIGS. 3-5. In FIG. 2, a touch controller 299 may be a programmable integrated circuit coupled as shown to supply drive signals 247 via respective printed electrically-conductive routing traces 380 or 385 to the plurality of transmit lines 350 of the touch sensor circuitry 302 illustrated in FIG. 3, and to receive sense signals 248 via respective printed electrically-conductive routing traces 390 from a plurality of receive lines 360 of the touch sensor circuitry 302 illustrated in FIG. 3. Touch controller 299 may perform other tasks, such as digitizing the received sense signals, storing the digital sense signals, generating touch signals based on the digital sense signals, and providing the generated touch signals 249 to CPU 205 via PCH 210 as shown. Further information on example touch sensor circuitry and touch controller architecture and components may be found in U.S. Pat. Nos. 10,656,761 and 10,216,304, each of which is incorporated herein by reference in its entirety for all purposes.

FIG. 3 illustrates an overhead view of a single upper (output) polarizer substrate 300 of a LCD display panel 296 that has an upper surface that is printed with pattern of touch sensor circuitry 302 (e.g., to form a projected capacitance "PCAP" touch sensor) according to one exemplary embodiment of the disclosed methods, apparatus and systems. The material of upper output polarizer substrate 300 may be, for example, a layer or sheet of cellulose triacetate (TAC) or other suitable polarizer substrate material such as polyvinyl alcohol (PVA) material, poly methyl methacrylate (PMMA) material, crystalline polymer materials, etc. In the illustrated exemplary embodiment, printed touch sensor circuitry 302 includes a matrix that includes a plurality of transparent and electrically conductive transmit lines (or drive lines) 350 oriented as rows of the matrix that intersect (e.g., in spaced relation to each other) a plurality of transparent and electrically conductive receive lines (or sense lines) 360 that are oriented as columns of the matrix as shown. Printed touch sensor circuitry 302 also includes electrically-conductive routing trace lines 380, 385 and 390 as shown and described further herein. In the embodiment of FIG. 3, each of electrically conductive transmit lines (or drive lines) 350 with its respective electrically-connected and electrically-conductive routing trace 380 or 385 is an independent electric circuit, and each of electrically-conductive receive lines (or sense lines) 360 with its respective electrically-connected and electrically-conductive routing trace 390 is an independent electric circuit.

In one embodiment, transmit lines 350 and receive lines 360 may be printed using any transparent electrically-conductive material that is suitable for consistently printing fine (thin) lines onto polarizer substrate 300. Examples of such suitable transparent electrically-conductive materials include, but are not limited to, indium-tin-oxide (ITO) ink, although any other transparent electrically-conductive ink may be employed that is suitable for consistently printing fine lines onto a polarizer substrate. In one embodiment, routing trace lines 380, 385 and 390 may be printed using any non-transparent or transparent electrically-conductive material (e.g., ink) including, but not limited to, the same materials (e.g., inks) described above for printing transmit lines 350 and receive lines 360.

As shown in FIG. 3, the plurality of receive lines 360 are arranged at an angle (e.g., 90°) to the plurality of transmit lines 350, such that a sense node 370 is formed at the spaced-apart intersection of each transmit line 350 (e.g., row line) and receive line 360 (e.g., column line). In one embodiment, transmit lines 350 are printed in a first plane on polarizer substrate 300 that is separated by a second plane of printed electrically-insulating material from a third plane in which receive lines 360 are printed, e.g., so that a receive line 360 overlies but does not contact a respective transmit line 350 at each sense node 370.

It will be understood that any suitable printing technique and/or architecture may be used to print electrically-insulating material between a given transmit line 350 and a given receive line 360 at their respective intersection (i.e., sense node 370). For example, in one embodiment, transmit lines 350 and receive lines 360 may be printed in the same (common) plane, and an electrically-insulating material may be printed only at (i.e., limited to) the location of the sense nodes 370 so as to electrically insulate the transmit lines 350 from the receive lines 360 wherever they intersect each other in the matrix. In another embodiment, receive lines 360 may be printed in a first plane on polarizer substrate 300 that is separated by a second plane of printed electrically-insulating material from a third plane in which transmit lines 350 are printed, e.g., so that a transmit line 350 overlies but does not contact a respective receive line 360 at each sense node 370.

Although the transmit lines 350 and receive lines 360 are illustrated as straight lines in FIG. 3, it is understood that transmit lines 350 and/or receive lines 360 may be implemented with alternative geometries. It is further understood that although transmit lines 350 and receive lines 360 are depicted as being substantially perpendicular to each other, they may be arranged at angles other than 90°, as long as they intersect (i.e., cross over each other in vertically spaced planes) to form sense nodes. Further, the particular number and scale (density) of transmit lines 350 and receive lines 360 illustrated in FIG. 3 is exemplary only, and provided for purposes of illustration. It will be understood that the number and scale of transmit lines 350 and receive lines 360 may vary (e.g., be greater in number) as required or needed for a given application.

In order to detect the presence and location of a finger (or other object) near or on one or more of the sense nodes 370 within the matrix of touch sensor circuitry 302, a drive signal is supplied to one or more of the transmit line/s 350 via respective routing trace/s 380/385 on the left and right sides of the touch sensor circuitry 302, which causes a signal charge to be injected into the receive line/s 360 and a capacitance ($C_{sig}$) to be generated at each affected one or more sense node/s 370. The capacitance can appear as a stray capacitance when the transmit lines are held at direct current (DC) levels, and as a mutual signal capacitance when the transmit lines are stimulated with an alternating current (AC) signal. When a user touches a particular location on the display screen of touch panel 296, a touch event may be detected at one or more of the sense nodes 370 that are positioned at the touched location by detecting a change in the signal charge caused by a change in the capacitance ($C_{sig}$) induced across these one or more sense nodes 370. When a signal charge is injected in this manner into a given receive line 360 at a given sense node 370, it may be sensed by touch controller 299 via its respective electrically-conductive routing trace 390 as an analog sense signal, which is in turn digitized by touch controller 299 and provided together with the respective digital location information (e.g., X-Y coordinate) of the given sense node 370 within the touch sensor circuitry 302 as a touch signals 249 to CPU 205, e.g., touch signals 249 include information (e.g., coordinates) that identify the location/s on display panel 296 that are touched by the user. In one exemplary embodiment, continuous scanning current sensing may be employed with touch controller 299 to detect touch events on single upper (output) polarizer substrate 300. In one such exemplary embodiment, relatively higher impedances are possible (e.g., relatively low impedance of traditional processes are not required), making many relatively higher resistance printed material processes acceptable.

It will be understood that the particular illustrated configuration (e.g., geometry, architecture, etc.) of routing traces 380, 385 and 390 is exemplary only, and that any other suitable routing trace configuration (e.g., geometry, architecture, etc.) may be alternately employed. Further information on example touch controller and touch sensor circuitry (including geometry of transmit lines, receive lines and routing trace circuitry) operation and architecture may be found in U.S. Pat. Nos. 10,656,761 and 10,216,304, each of which is incorporated herein by reference in its entirety for all purposes.

Also shown in FIG. 3 is touch connection extension 330 which may include multiple electrical conductors that are present for purpose of electrically connecting individual transmit lines 380, 385 to individual respective drive signals 247 of FIG. 2, and for electrically connecting individual receive lines 390 to individual respective sense signals 248 of FIG. 2. In one embodiment, touch connection extension 330 may be configured to have suitable first electrical connectors that may be coupled to mating second electrical connectors of a communication bus/es or other electrically electrical conductor/s to exchange (transfer) the drive signals 247 and sense signals 248 with touch controller 299.

FIG. 4A illustrates an exemplary layer stackup 400 for a LCD display panel with touch sensor 296 for use in a LCD display touch panel assembly 225 according to one embodiment of the disclosed methods, apparatus and systems. For purpose of illustration and context, layer stackup 400 of LCD display panel with touch sensor 296 is shown illuminated by a backlight panel 294 (e.g., LED panel or CCFL panel). As shown in FIG. 4A, layer stackup 400 includes a LCD display panel with touch sensor 296 that includes a 9-hardness (9H) protective cover 402 that is assembled to the other components of LCD panel with touch sensor 296 by a single optically clear adhesive (OCA) layer 404. The LCD display panel with touch sensor 296 includes an image layer (e.g., thin-film-transistor (TFT) layer) 416 that generates images and is disposed between a first (upper) output polarizer substrate 300 and a second (lower) input polarizer substrate 418 as shown. As shown in FIG. 4A, touch sensor circuitry 302 of FIG. 3 (e.g., including transmit lines 350, receive lines 360 and routing trace lines 380, 385 and 390) is directly printed onto the polarizer material of the first (upper) output polarizer substrate 300 to form a single-substrate polarizer and touch sensor 300, e.g., with no OCA or other adhesive disposed or otherwise present between the touch sensor circuitry and polarizer substrate 300.

Figure 1:
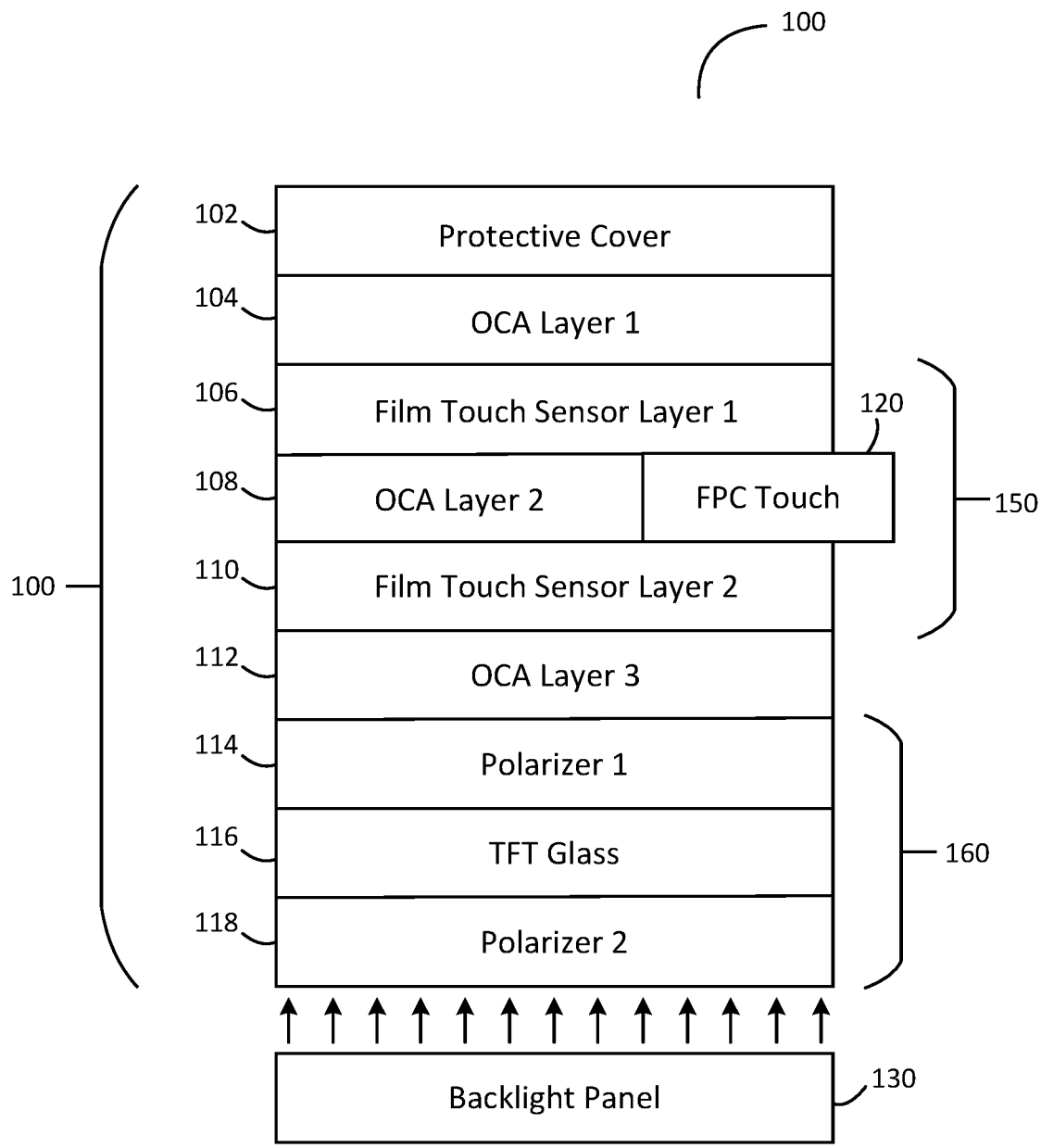
FIG. 1 illustrates a conventional layer stackup for a conventional touch screen display that is illuminated by a backlight area of a conventional touch screen display device.

In contrast to stand-alone conventional touch sensor module 150 of FIG. 1, the touch sensor circuitry 302 of the touch sensor of FIG. 4A is part of the same single substrate 300 that forms both the polarizer and the touch sensor, and the touch sensor circuitry 302 is not part of a separate stand-alone touch sensor module. As described further herein, the touch sensor circuitry 302 of FIG. 3 is directly printed onto the polarizer material of the upper polarizer substrate to form a combined polarizer and touch sensor on the same single substrate with the touch sensor circuitry 302 disposed in direct contact with the polarizer material of the upper polarizer substrate, and this single polarizer and touch sensor substrate is in turn a subcomponent of the layer stackup 400 for a LCD display panel with touch sensor 296.

Also shown in FIG. 4A is touch connection extension 330 that may be electrically coupled between respective trace lines 380, 385 and 390 of touch sensor circuitry 302 and corresponding mating electrical connectors of a communication bus or other electrically electrical conductor/s to exchange drive signals 247 and sense signals 248 with touch controller 299 as previously described. Advantageously, no separate touch connector layer is required, as is the case with the conventional configuration in which a separate touch connector layer 120 is required to be disposed between a first film touch sensor layer 106 and a second film touch sensor layer 110 as described and illustrated with regard to the conventional technology of FIG. 1. Rather, touch connection extension 330 of FIG. 4A is connected to, and present in, the same layer as single substrate polarizer with touch sensor 300, which reduces the number of required layers as compared to the conventional configuration.

FIG. 4B illustrates single substrate polarizer with touch sensor 300 with touch connection extension 330 (e.g., as it may be manufactured separately from the other components of layer stackup 400 of FIG. 4A). As shown, transmit lines 350 of touch sensor circuitry 302 are printed in a first plane 470 on polarizer material 468 of substrate 300. The first plane 470 of printed transmit lines 350 of touch sensor circuitry 302 is separated by a second plane 472 of printed electrically-insulating material 355 from a third plane 474 in which receive lines 360 of touch sensor circuitry 302 are printed so that each transmit line 350 overlies but does not contact a respective receive line 350 at each sense node 370. Locations of sense nodes 370 are represented in dashed outline. In this embodiment of FIG. 4B, first plane 470, second plane 472 and third plane 474 are oriented parallel to each other.

FIG. 5 illustrates a methodology 500 that may be implemented in part to fabricate polarizer and touch sensor circuitry as a single substrate 300 of FIGS. 4A and 4B, e.g., that may be manufactured separately and independently from other components of layer stackup 400 for a LCD display panel 296. As shown in FIG. 5, methodology 500 also may be further implemented to form LCD display panel with touch sensor 296, display panel assembly 225, and information handling system 200. As shown, methodology 500 begins in block 502 where the bare polarizer substrate 300 is fabricated, e.g., from cellulose triacetate (TAC) or other suitable polarizer substrate material including, but limited to, polyvinyl alcohol (PVA) material, poly methyl methacrylate (PMMA) material, crystalline polymer materials, etc.

Next in block 504, touch sensor circuitry 302 is printed directly to the single bare polarizer substrate 300, e.g., before it is assembled to any other component/s of layer stackup 400. Examples of suitable printing techniques that may be employed in block 504 to print touch sensor circuitry 302 to polarizer substrate include, but are not limited to, roll-to-roll processes. In one embodiment of methodology 500, the touch sensor circuitry 302 (including respective electrically-conductive routing traces 380, 385 and 390) may be first printed directly on the bare polarizer substrate 300 (with no other material between the bare polarizer material of substrate 300 and the printed touch sensor circuitry 302 so that the touch sensor circuitry 302 disposed in direct physical contact with the polarizer material of the bare polarizer substrate 300) to manufacture a combined polarizer and touch sensor substrate 300 at a first manufacturing facility. This manufactured substrate 300 may later be assembled with other layer stackup components of FIG. 4A to form the completed LCD display panel 296, e.g., at a second and different manufacturing facility. In one example, multiple copies of combined polarizer and touch sensor substrate 300 may be manufactured together on a roll and then the roll transferred (e.g., shipped by rail, aircraft or ship) together to a separate and different manufacturing facility where the copies of combined polarizer and touch sensor substrate 300 are unrolled, segmented and assembled with other layer stackup components of FIG. 4A to form the completed LCD display panel 296.

In one embodiment, electrically-conductive transmit lines 350 and receive lines 360 of touch sensor circuitry 302 may be first printed in block 504 using transparent electrically-conductive indium-tin-oxide (ITO) ink or any other suitable relatively low temperature transparent conductive ink. Also in block 504, with respective printed electrically-conductive routing traces 380, 385 and 390 may also be printed using electrically-conductive indium-tin-oxide (ITO) ink or any other suitable relatively low temperature transparent or non-transparent conductive ink. In one embodiment, such relatively low temperature inks may be printed at room temperature, alternatively printed at a temperature less than 30° C., alternatively printed at a temperature from 20° C. to 30° C., and are therefore particularly compatible with polarizer substrate materials, e.g., in contrast to one glass solution (OGS) and similar techniques that employ higher process temperatures of 80° C. to 120° C. that would degrade polarization of polarizer materials.

As previously described, transmit lines 350 may be printed (e.g., with a film thickness of less than 10 microns, alternatively from 5 to 10 microns) in a first plane 470 on polarizer substrate 300. A layer of electrically-insulating material may then be printed over the transmit lines 350 in a second plane 472 that is parallel to and different from (e.g., overlies) the first plane 470. Receive lines 360 may then be printed ((e.g., with a film thickness of less than 10 microns, alternatively from 5 to 10 microns) over the layer of insulating material in a third plane 474 on polarizer substrate 300 that is parallel to and different from (e.g., overlies) the second plane 472. The total thickness of the touch sensor circuitry 302 may so printed in one embodiment to have a thickness of less than or equal to 30 microns (alternatively from 8 microns to 30 microns, alternatively from 20 microns to 30 microns) depending on the particular design, and such that each given transmit line 350 overlies but does not contact a respective sense line 350 at each sense node 370, i.e., transmit lines 350 are separated from receive lines 360 by the printed insulating layer. It will be understood that each of the above ranges of printed material thickness for transmit lines 350, insulating material, and receive lines 360 is exemplary only, and that other greater or lesser thicknesses are alternatively possible for each of transmit lines 350, insulating material, and/or receive lines 360.

Next in block 506, touch connection extension area 330 is masked and an adhesive layer 404 (e.g., OCA adhesive) is applied to (e.g., over) touch sensor circuitry/polarizer substrate 300 (e.g., to a thickness of 50 microns or any suitable greater or lesser thickness). Then, in block 507, a transparent protective cover 402 (e.g., 9-hardness "9H" material) may then be placed over and adhered to combined polarizer and touch sensor substrate 300 by an OCA adhesive layer 404. Next, in block 508, touch connection extension area 330 is electrically connected to respective electrically-conductive routing traces 380, 385 and 390. The combined polarizer and touch sensor substrate 300 with transparent protective cover 402 may then be optionally packaged and shipped in block 509 to another and different manufacturing facility for assembly with other components to form LCD display panel with touch sensor 296 (e.g., block 509 may be omitted where the assembly of block 510 below occurs in the same manufacturing facility where combined polarizer and touch sensor substrate 300 with transparent protective cover 402 is manufactured by blocks 502 to 508).

Next, in block 510, the combined polarizer and touch sensor substrate 300 of block 508 (e.g., together with its protective cover 402) may be assembled together with other layer stackup components of FIG. 4A to form the completed LCD display panel with touch sensor 296 of FIG. 4A, e.g., by attaching combined polarizer and touch sensor substrate 300 with its protective cover 402 to image layer 416 and input polarizer substrate 418 (e.g., such as by mechanically securing these components together at their periphery with a plastic or rubber retainer structure). In one exemplary embodiment, the combined polarizer and touch sensor substrate 300 of block 508 (e.g., together with its protective cover 402) may be manufactured at a first manufacturing facility, and optionally rolled or otherwise packaged for shipment in block 509 to a separate second manufacturing facility for assembly together with other layer stackup components of FIG. 4A in block 510 to form the completed LCD display panel 296. Completed LCD display panel 296 may then be assembled together at the same or a different manufacturing facility in block 512 with other components to form display panel assembly 225 of FIG. 2, and completed display panel assembly 225 may then be assembled together at the same or a different manufacturing facility in block 514 with other components to form information handling system 200 of FIG. 2.

In one embodiment, methodology 500 of FIG. 5 may be used to manufacture an LCD display panel with touch sensor 296 with a single adhesive layer 404 having an overall thickness that is less than the combined overall thickness of a conventional LCD display panel 160 that is separately-formed and attached to a conventional independent touch sensor module 150 (and together employing at least three separate adhesive layers) as described in relation to FIG. 1.

It will be understood that the identity and sequence of blocks of methodology 500 shown and described herein are exemplary only, and that any combination of fewer, additional and/or alternative blocks may be employed that are suitable for fabricating a single-substrate polarizer with touch sensor circuitry for a LCD display panel with touch sensor.

It will also be understood that one or more of the tasks, functions, or methodologies described herein (e.g., including those described herein for components 203, 205, 207, 210, 211, 220, 221, 223, 235, 265, 273, 285, 299, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods, apparatus and systems may be utilized in various combinations and/or independently. Thus the invention is not limited to only those combinations shown herein, but rather may include other combinations.

What is claimed is:

1. A method, comprising:
   printing touch sensor circuitry directly to a bare polarizer material of only a first side of a first polarizer substrate that has opposing first and second sides to form the touch sensor circuitry directly on the polarizer material of only the first side of the first polarizer substrate; and
   assembling an image layer for a display panel directly to the opposing second side of the bare polarizer material of the first polarizer substrate such that the first polarizer substrate is disposed between the touch sensor circuitry and the image layer with no touch sensor circuitry disposed between the first polarizer substrate and the image layer;
   where the touch sensor circuitry comprises a plurality of electrically-conductive drive lines and a plurality of transparent and electrically conductive sense lines;
   where the method further comprises printing electrically-conductive routing traces directly to the bare polarizer material of the only the first side of the first polarizer substrate, each of the electrically-conductive routing traces being electrically coupled to a respective one of the electrically-conductive drive lines or the electrically conductive sense lines of the touch sensor circuitry;
   where the printing electrically-conductive routing traces directly to the bare polarizer material of the only the first side of the first polarizer substrate comprises printing the electrically-conductive routing traces disposed in direct physical contact with the bare polarizer material of the only the first side of the polarizer substrate; and
   where the first polarizer substrate has side edges extending between the opposing first and second sides of the first polarizer substrate; and
   where the method further comprises providing a touch connection extension mechanically connected to a given one of the side edges such that the touch connection extension extends sideways and outward in cantilevered manner from the given one of the side edges of the first polarizer substrate and such that the touch connection extension is only disposed in the same plane as the layer of the first polarizer substrate, the touch connection extension comprising multiple electrical conductors that are coupled to individual ones of the routing traces.

2. The method of claim 1, further comprising:
   printing the touch sensor circuitry in direct physical contact with only the first side of the polarizer material of the first polarizer substrate, and
   assembling the image layer to the first polarizer substrate to form a display panel by mechanically securing together the image layer and the first polarizer substrate together with a plastic or rubber retainer structure.

3. The method of claim 2, further comprising: forming a display panel assembly by:
   assembling the display panel with a backlight panel that illuminates the display panel, and a second polarizer substrate that comprises polarizer material and is disposed between the backlight panel and the image layer; and
   providing at least one first programmable integrated circuit programmed to receive image content data, the at least one first programmable integrated circuit being programmed to generate image output signals from the received image content data to control the image layer of the display panel to generate display images while at the same time the backlight panel illuminates the display panel;
   where the method further comprises:
      assembling the image layer of the display panel between the backlight panel and the first polarizer substrate, and
      coupling the image layer to receive the image output signal from the at least one first programmable integrated circuit.

4. The method of claim 3, further comprising providing at least one second programmable integrated circuit that is external to the display panel assembly; and coupling the at least one second programmable integrated circuit to the first programmable integrated circuit of the display panel assembly, the second programmable integrated circuit being programmed to provide the image content data to the at least one first programmable integrated circuit of the display panel assembly.

5. The method of claim 4, where the at least one second programmable integrated circuit comprises a host programmable integrated circuit, a graphics processing unit (GPU), or an embedded controller (EC) of an information handling system; and where the at least one first programmable integrated circuit of the display panel assembly comprises a timing controller (Tcon) of the display panel assembly.

6. The method of claim 3, where the display panel is a liquid crystal (LCD) display panel; and where the backlight panel is a light emitting diode (LED) backlight panel.

7. The method of claim 2, further comprising: forming a display panel assembly by:
   coupling at least one second programmable integrated circuit to the touch sensor circuitry, the at least one second programmable integrated circuit being programmed to:
      provide drive signals to the touch sensor circuitry,
      receive sense signals from the touch sensor circuitry, and
      generate touch signals from the received sense signals, the touch signals including information identifying touched locations of the touch sensor circuitry.

8. The method of claim 7, where the touch sensor circuitry comprises a plurality of transparent and electrically-conductive drive lines disposed in intersecting spaced relationship with a plurality of transparent and electrically conductive sense lines that generate the sense signals.

9. The method of claim 7, further comprising providing at least one third programmable integrated circuit that is external to the display panel assembly; and coupling the at least one third programmable integrated circuit to the second programmable integrated circuit of the display panel assembly, the third programmable integrated circuit being programmed to receive the touch signals from the second programmable integrated circuit.

10. The method of claim 9, where the at least one third programmable integrated circuit comprises a host programmable integrated circuit of an information handling system; where the at least one second programmable integrated circuit comprises a touch controller of the display panel assembly; and where the at least one first programmable integrated circuit comprises a timing controller (Tcon) of the display panel assembly.

11. The method of claim 9, further comprising forming an information handling system by assembling the display panel assembly to the at least one third programmable integrated circuit that is external to the display panel assembly.

12. The method of claim 1, where the bare polarizer material of the first polarizer substrate comprises cellulose triacetate (TAC), polyvinyl alcohol (PVA) material, poly methyl methacrylate (PMMA), material, or a crystalline polymer material; and where the printing the touch sensor circuitry comprises printing indium-tin-oxide (ITO) ink directly to the bare polarizer material to form the touch sensor circuitry directly on the polarizer material of the first polarizer substrate.

13. The method of claim 1, where the electrically-conductive drive lines and the electrically conductive sense lines of the touch sensor circuitry comprise a plurality of transparent and electrically-conductive drive lines disposed in intersecting spaced relationship with a plurality of transparent and electrically conductive sense lines, the plurality of drive lines being printed to intersect the plurality of sense lines in spaced relationship to each other at respective sense nodes.

14. The method of claim 1, further comprising forming a display panel by assembling the first polarizer substrate including the printed touch sensor circuitry with other components that comprise the image layer and a second polarizer substrate, the first polarizer substrate being assembled with the other components so that the image layer is disposed between the first polarizer substrate and the second polarizer substrate.

15. The method of claim 14, further comprising:
forming a display panel assembly by assembling the display panel with a backlight panel, at least one first programmable integrated circuit, and at least one second programmable integrated circuit;
where the at least one first programmable integrated circuit is coupled to the image layer of the display panel and is programmed to receive image content data and to generate image output signals from the received image content data to control the image layer of the display panel to generate display images while the backlight panel illuminates the display panel; and
where the at least one second programmable integrated circuit is coupled to the touch sensor circuitry and is programmed to receive sense signals from the touch sensor circuitry and to generate touch signals from the sense signals.

16. The method of claim 1, where the printed touch sensor circuitry formed only on the first side of the first polarizer substrate comprises transmit lines and receive lines separated by electrically-insulating material with each of the transmit lines, receive lines and electrically-insulating material overlying the first side of the first polarizer substrate.

17. The method of claim 1, where no adhesive is present between the printed touch sensor circuitry and the first side of the first polarizer substrate.

18. The method of claim 1, further comprising:
first manufacturing multiple copies of a combined polarizer and touch sensor substrate on a roll, each of the multiple copies of the combined polarizer and touch sensor substrate being manufactured by printing the touch sensor circuitry in direct physical contact with the polarizer material of the first polarizer substrate;
then unrolling the multiple copies of the combined polarizer and touch sensor substrate from the roll;
then segmenting the multiple copies of the combined polarizer and touch sensor substrate from the roll; and
then assembling each of the segmented copies of the combined polarizer and touch sensor substrate with an image layer to form a respective display panel.

19. The method of claim 1, where the printed touch sensor circuitry formed only on the first side of the first polarizer substrate comprises a matrix of transmit lines and receive lines printed in the same plane and intersecting with each other at respective sense nodes;
and an electrically-insulating material printed only at the location of the respective sense nodes so as to electrically insulate the transmit lines from the receive lines wherever they intersect each other in the matrix.

20. The method of claim 1, where the printed touch sensor circuitry formed only on the first side of the first polarizer substrate comprises a matrix of transmit lines and receive lines and intersecting with each other at respective sense nodes, and only one of:
where the transmit lines are printed in a first plane on the first polarizer substrate and are separated by a second plane of printed electrically-insulating material from a third plane in which the receive lines are printed such that each receive line overlies but does not contact a respective transmit line at each sense node; or
where the receive lines are printed in the first plane on the first polarizer substrate and are separated by the second plane of printed electrically-insulating material from the third plane in which the transmit lines are printed such that each transmit line overlies but does not contact a respective receive line at each sense node.

* * * * *